(12) United States Patent
Van Delden et al.

(10) Patent No.: US 9,633,610 B2
(45) Date of Patent: Apr. 25, 2017

(54) DRIVE METHOD FOR AN ELECTROPHORETIC CELL AND AN ELECTROPHORETIC DEVICE

(75) Inventors: Martinus Hermanus Wilhelmus Maria Van Delden, Eindhoven (NL); Sander Jurgen Roosendaal, Eindhoven (NL); Patrick John Baesjou, Eindhoven (NL); Alwin Rogier Martijn Verschueren, Eindhoven (NL); Franciscus Paulus Maria Budzelaar, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 539 days.

(21) Appl. No.: 12/516,814

(22) PCT Filed: Nov. 27, 2007

(86) PCT No.: PCT/IB2007/054797
§ 371 (c)(1),
(2), (4) Date: May 29, 2009

(87) PCT Pub. No.: WO2008/065603
PCT Pub. Date: Jun. 5, 2008

(65) Prior Publication Data
US 2010/0060623 A1    Mar. 11, 2010

(30) Foreign Application Priority Data
Nov. 30, 2006 (EP) ..................... 06125051

(51) Int. Cl.
G06F 3/038    (2013.01)
G09G 3/34     (2006.01)
(Continued)

(52) U.S. Cl.
CPC ... *G09G 3/3446* (2013.01); *G02F 2001/1676* (2013.01); *G09G 3/2011* (2013.01);
(Continued)

(58) Field of Classification Search
USPC .................................. 345/107, 211
See application file for complete search history.

(56) References Cited

U.S. PATENT DOCUMENTS 6,538,801 B2    3/2003  Jacobson
6,927,892 B2 *  8/2005  Ho et al. ............. 359/296
(Continued)

FOREIGN PATENT DOCUMENTS

EP    1634266 A1    3/2006
TW    200539103 A   12/2005
(Continued)

*Primary Examiner* — Jonathan Blancha

(57) ABSTRACT

The present invention relates to a drive method for an electrophoretic cell and a device adapted to implement the method. The cell comprises a first storage electrode (24), a second storage electrode (22), a first target area electrode (28), a second target area electrode (30), a first type of particle (32) and a second type of particles (33), said second type of particles being of opposite polarity to the first type of particles. An area (31) extending between the target area electrodes (28, 30) is a target area. The method comprises a reset phase (110), wherein said first and second type of particle are reset to determined reset positions, a first write phase (120), wherein the first type of particles are moved to and/or from the storage electrodes and change in amount in said target area (31), a second write phase (140) similar to the first write phase but for the second type of particles, and a spread phase (150) so that the particles in said target area (31) distribute and mix. The method allows for short distance movements and two particle type in the same cell can be written comparatively fast.

19 Claims, 8 Drawing Sheets

(51) Int. Cl.
*G02F 1/167* (2006.01)
*G09G 3/20* (2006.01)

(52) U.S. Cl.
CPC ......... *G09G 3/2014* (2013.01); *G09G 3/2022* (2013.01); *G09G 2300/0426* (2013.01); *G09G 2300/0434* (2013.01); *G09G 2300/0465* (2013.01); *G09G 2300/06* (2013.01); *G09G 2310/0245* (2013.01); *G09G 2310/04* (2013.01); *G09G 2320/0252* (2013.01); *G09G 2320/0261* (2013.01); *G09G 2380/02* (2013.01)

(56) References Cited

U.S. PATENT DOCUMENTS

| | | | |
|---|---|---|---|
| 7,075,502 B1 * | 7/2006 | Drzaic et al. | 345/55 |
| 2001/0030639 A1 * | 10/2001 | Goden | 345/107 |
| 2003/0043450 A1 * | 3/2003 | Liang et al. | 359/296 |
| 2003/0081305 A1 | 5/2003 | Chung et al. | |
| 2003/0095094 A1 * | 5/2003 | Goden | G02F 1/167 345/107 |
| 2003/0231162 A1 * | 12/2003 | Kishi | G02F 1/167 345/107 |
| 2004/0239613 A1 | 12/2004 | Kishi | |
| 2005/0035941 A1 | 2/2005 | Albert et al. | |
| 2006/0038772 A1 * | 2/2006 | Amundson et al. | 345/107 |
| 2006/0050362 A1 | 3/2006 | Johnson et al. | |
| 2006/0279525 A1 * | 12/2006 | Matsuda | 345/107 |

FOREIGN PATENT DOCUMENTS

| | | | |
|---|---|---|---|
| WO | 2004066023 A1 | 8/2004 | |
| WO | 2004088409 A1 | 10/2004 | |
| WO | 2005040908 A1 | 5/2005 | |
| WO | WO 2005076062 A1 * | 8/2005 | G02F 1/167 |
| WO | 2005093508 A1 | 10/2005 | |
| WO | 2006016301 A1 | 6/2006 | |

* cited by examiner

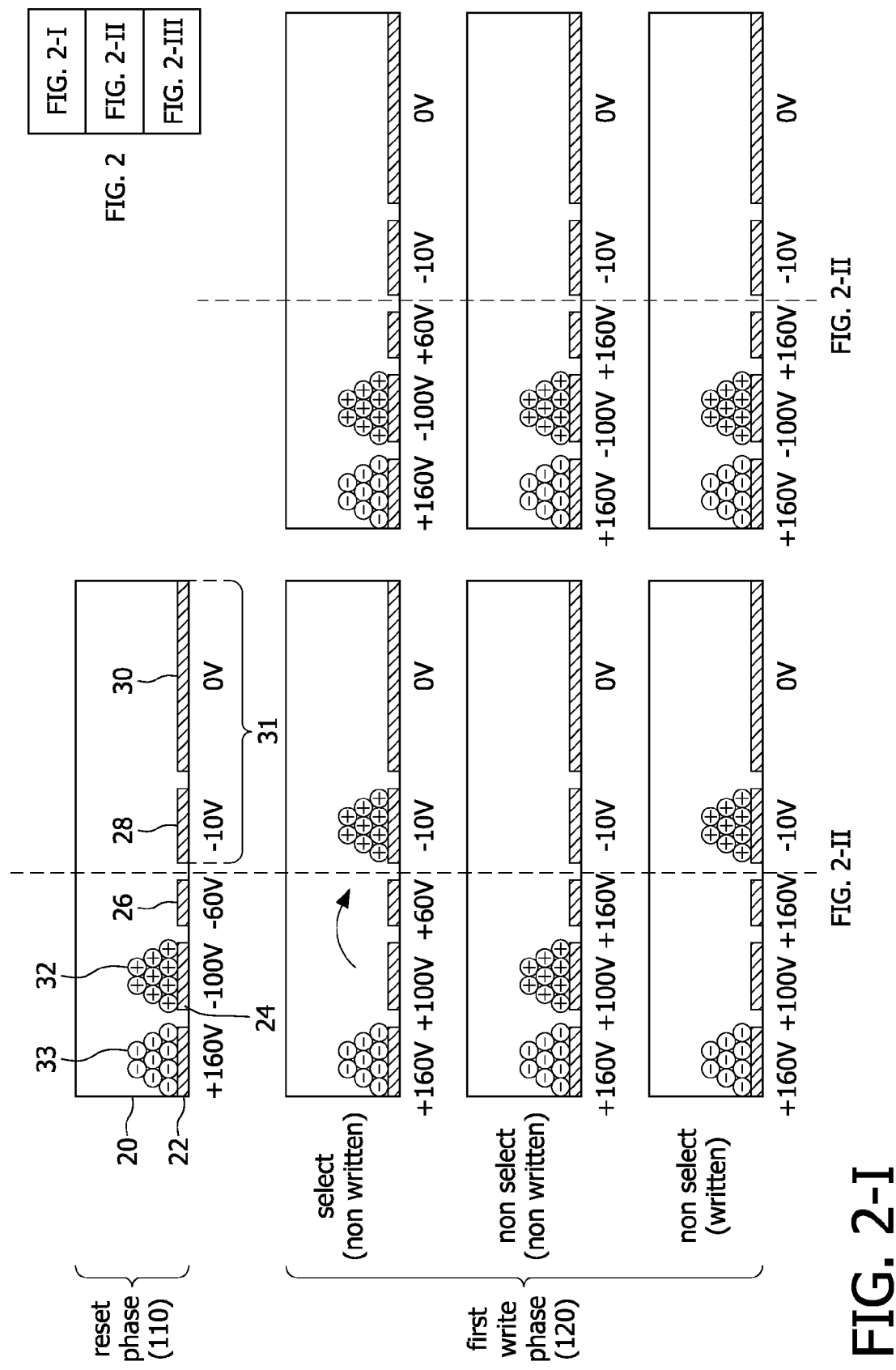

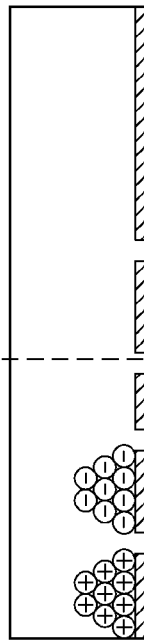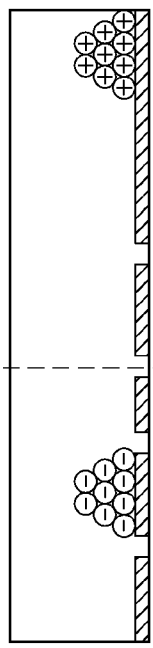
FIG. 2-II

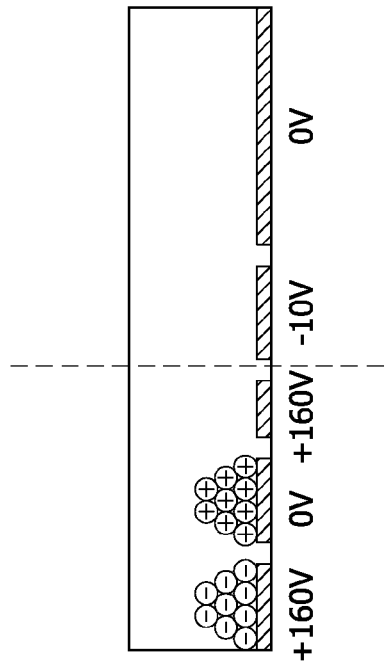
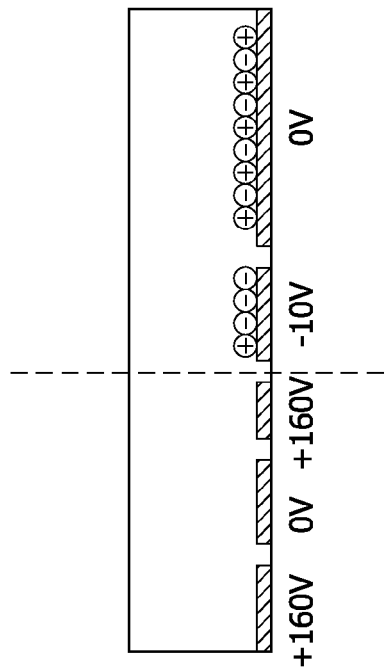
FIG. 2-III

1

DRIVE METHOD FOR AN ELECTROPHORETIC CELL AND AN ELECTROPHORETIC DEVICE

FIELD OF THE INVENTION

The invention relates generally to an electrophoretic cell, such as used in an electrophoretic display. More specifically, it relates to a drive method of an electrophoretic cell and a device adapted to implement the method.

BACKGROUND OF THE INVENTION

Electrophoretic display devices are one example of a bi-stable display technology, which use the movement of charged particles controlled by an electric field to provide a selective light scattering or absorption function.

In one example, white particles are suspended in an absorptive liquid, and the electric field is used to bring the particles to the surface of the device. In this position they may perform a light scattering function so that the display appears white. Movement away from the top surface enables the color of the liquid, for example black, to be seen. In another example, there may be two types of particles, for example black negatively charged particles and white positively charged particles, suspended in a transparent fluid.

Electrophoretic display devices enable low power consumption as a result of their bi-stability (an image can be retained with no voltage applied), and they enable thin and bright display devices as there is no need for a backlight or polarizer.

Another important factor in electrophoretic displays is low-cost manufacturing. Since the devices can be made from plastic materials, cost reduction by means of reel-to-reel manufacturing is possible. For such manufacturing, it is desirable that the electronic devices only require the use of a single display medium layer. Low cost requirements further makes it desirable to employ passive direct drive addressing schemes. The most simple configuration of such a display device is a segmented reflective display. A segmented reflective electrophoretic display has low power consumption, good brightness and is bi-stable in operation, and thus able to display information even when the power is turned off.

A known electrophoretic display in the form of a passive matrix and utilizing particles having a threshold, comprises a lower electrode layer, a display medium layer accommodating the particles suspended in a transparent or colored fluid, and an upper electrode layer. Biasing voltages are applied selectively to electrodes in the upper and/or lower electrode layers to control the state of the portion(s) of the display medium associated with the electrode being biased.

One type of electrophoretic display devices uses so-called "in-plane switching". In-plane electrophoretic displays use selective lateral movement of the particles in the display material layer. When the particles are randomly dispersed, they block the passage of light to the underlying surface and the particle color is seen. The particles may be colored and the underlying surface black or white, or else the particles can be black or white, and the underlying surface colored.

Advantages of in-plane switching are that the device can be adapted for both reflective and/or transmissive operation. Particles may be moved to create a passageway for light, so that both reflective and transmissive properties can be implemented. This enables operation by illumination using a backlight as well as reflective operation by illumination with ambient light and using a reflector. The in-plane electrodes are provided on one substrate, or two substrates facing each other provided with electrodes. In-plane electrophoretic display devices can provide viewing angle independent brightness and color.

Active matrix addressing schemes are also used for electrophoretic displays. These are generally required when fast image updating is desired for bright full color displays and higher contrast ratio with many grayscales. Such devices are of particular interest for signage and billboard applications, and as (pixelated) light sources in electronic window and ambient lighting applications. Colors are implemented using color filters, and the display pixels then function as grayscale devices, or by a subtractive color principle, or a combination using both color filters and a subtractive color principle.

Known electrophoretic displays are driven by complex driving signals. For a pixel to be switched from one gray-level to another, it is often first switched to white or black in a reset phase and then to the final gray-level. Gray-level to gray-level transitions and black/white to gray-level transitions are more slower and more complicated than black to white, white to black, gray to white or gray to black transitions.

For example, in a color display a particle with a characteristic absorption spectrum used, and the display may be driven in such a way that many different levels of absorption at the characteristic wavelengths can be achieved. By accurate control of the number of magenta particles, for example, the optical density of the medium in the green part of the spectrum can have many different values, also known as "gray levels".

One significant problem with electrophoretic cells, in particular when these are arranged in a passive matrix based display, is the time taken to address and write an image. This is partly owing to that the pixel output is dependent on the physical position of the particles within the pixel cells, and that moving the particles over a certain distance takes time, and since the particles in general move relatively slow, also writing of the electrophoretic cells is slow. This is a particular problem in IPEP displays where the particles typically have to move over larger (in-plane) distances than in the case of "out-of-plane" devices.

Typical pixel addressing/writing times range between several tens to hundreds of milliseconds for small-sized pixels in out-of-plane switching electrophoretic displays and up to several minutes for larger-sized pixels in in-plane electrophoretic displays. Furthermore, the displacement speed of the particles scales with the applied field. Thus, in principle, the higher the applied field, the shorter the addressing/writing time, however, high voltages to generate these field are not always available or possible to use.

In its simplest form an electrophoretic pixel can be controlled to exhibit two different colors, e.g. black and white, i.e. 1 bit color. This is unacceptable for e-books and e-signage, which are considered to require at least 4-6 bit grayscales. At present, the number of accurate and reproducible gray-scales that can be achieved in commercially available products is just 4.

Reproducing more than 1 bit color, in a reproducible and uniform manner, and for more than one type of pigment is therefore desirable. This, however, requires control of more than one type of particles per cell, which in turn requires more complex cells, e.g. cells comprising more electrodes, or multiple cells of different colors to form multi-color pixels. In one known example multi-color is achieved by stacking two or more monochromatic display layers of different color. However, due to the stacking the image quality is impaired, or parallax may arise and/or the light absorption is increased.

Another aspect in in-plane electrophoretic display devices is the pixel aperture, i.e. the part of the cell area that directly contributes to the visible output, which comprises parameters such as contrast, brightness, viewing angle, color saturation, parallax, Moiré etc. It is desirable that the visible area of the pixel is as large as possible. However, since the number of particles in a pixel is constant, the pigments that result in a dark state must be stored somewhere during a bright state. This is achieved at the expense of the pixel's aperture by means of storage electrodes.

US 20040239613 discloses an electrophoretic display device including a back substrate that is spaced apart from and facing an observation side substrate. The cells are located in the space between the substrates, which space is filled with a transparent insulating migration liquid in which there are two types of charged particles. The particles differ in charge polarity and coloration. In each cell the display area is in the form of transparent display electrode that is disposed on one of the substrates and there are two collection electrodes, one at each substrate and facing each other. In US 20040239613 the two types of particles are moved both laterally and vertically with respect to the planes of the substrates. In order to accomplish a multicolor display, US 20040239613 discloses stacking of the cells where each cell in the stack has differently colored particles. Since a display electrode covers the visible area of the pixel, this inevitable leads to increased parallax, Moiré and increased light absorption and thus less bright pixels. It also leads to more complex and more expensive devices.

SUMMARY OF THE INVENTION

It is an object of the invention to overcome or at least alleviate problems in the prior art. A specific object is to allow for efficient and comparatively fast driving of an electrophoretic cell with control of at least two different types of particles.

The invention is defined by the appended independent claims. Preferred embodiments are set forth in the dependent claims and in the following description and drawings.

Hence, according to a first aspect, the above-mentioned and other objects that will be evident from the following description, are achieved by a drive method for an electrophoretic cell, said cell comprising a first storage electrode, a second storage electrode, a first target area electrode, a second target area electrode, a first type of particles and second type of particles, said second type of particles being of opposite charge polarity to the first type of particles, said target area electrodes and an area extending between said target area electrodes being a target area, each of said storage electrodes being located outside said target area, said method comprising: in a reset phase, applying electrode control signals so that said first and second type of particles are reset to determined reset positions in said cell; in a first write phase, applying electrode control signals so that the first type of particles are moved to and/or from one of the storage electrodes and thereby change in amount in said target area and the amount of the second type of particles is retained in the target area; in a second write phase, applying electrode control signals so that the second type of particles are moved to and/or from one of the storage electrodes and thereby change in amount in said target area and the first type of particles is retained in the target area; and in a spread phase, applying electrode control signals so that the first and second type of particles which are positioned in said target area, distribute and mix in said target area.

According to a second aspect, the above-mentioned and other objects that will be evident from the following description, are achieved by an electrophoretic device comprising at least one electrophoretic cell, said cell comprising a first storage electrode, a second storage electrode, a first target area electrode, a second target area electrode, a first type of particles and second type of particles, said second type of particles being of opposite charge polarity to the first type of particles, said target area electrodes and an area extending between said target area electrodes being a target area, each of said storage electrodes being located outside said target area, said device further comprising a controller for controlling electrode potentials of said at least one electrophoretic cell, said controller being adapted to: in a reset phase, applying electrode control signals so that said first and second type of particles are reset to determined reset positions in said cell; in a first write phase, applying electrode control signals so that the first type of particles are moved to and/or from one of the storage electrodes and thereby change in amount in said target area and the amount of the second type of particles is retained in the target area; in a second write phase, applying electrode control signals so that the second type of particles are moved to and/or from one of the storage electrodes and thereby change in amount in said target area and the amount of the first type of particles is retained in the target area; and in a spread phase, applying electrode control signals so that the first and second type of particles which are positioned in said target area, distribute and mix in said target area.

Note that an "amount" of particles here can include also 0 particles. The two oppositely charged particle types together with the double electrodes of each type allow for holding one type of particles both within as well as outside the target area while moving the other. This makes it possible in each write phase to keep control of the type of particles that are not being moved to/from the target area.

All phases except for the reset phase are based on moving particle to/from determined positions, which is the main reason for the reset phase, namely to enable execution of the other phases. The determined positions in the reset phase can e.g. be one type of particles at each one of the storage electrodes, both types in the target area, one type at each target area electrode, one type at one storage electrode and the other type at one target area electrode. It is also possible with e.g. an amount of one type of particles at a storage electrode and the rest of the particles of that type at a target area electrode etc.

The write phases only involve moving particles to or from the target area, without any requirement that the particles have to move to an exact position or be spread in this area. Both types of particles can e.g. be moved to the closest target area electrode. Hence the distances being moved by the particles during both of the write phases can be short and thus execution of the write phases can be comparatively fast. Moreover, the area between the target area electrodes allows for a transparent aperture between the electrodes with low absorption, compared to for example when only one large target, or display, electrode is used for the particles.

The storage electrodes may be located on the same side of the target area and the first storage electrode may be positioned closest to said target area, and said method may further comprise: in the first write phase, the first type of particles may be moved to and/or from the first storage electrode; in a swap phase, between the write phases, electrode control signals may be applied so that any particles of the first type at the first storage electrode will swap to the second storage electrode; and in the second write phase, the second type of particles may be moved to and/or from said first storage electrode.

Utilizing the closest storage electrode to move particles to and/or from the target area during the first write phase facilitate fast execution of the first write phase. In the swap phase, the first type of particles are moved to the second storage electrode in order to free up the first storage electrode for use during the second write phase. In the second write phase the second type of particles are moved to/from the first storage electrode and the second particles will thus move the same short distance to/from the target area as the first type of particles were in the first write phase, which allow for also a fast second write phase.

In case neither the first nor the second type of particles possess threshold properties that is utilized when moving the particles, this "same side storage" electrode layout may advantageously be combined with a single gate electrode positioned between first storage electrode and target area. The single gate electrode supported by one of the storage electrodes allow for control of both particle types during the write phases. When for example the storage electrodes are positioned on each side of the target area and the particles have no threshold properties, two gate electrodes are typically required.

The control signals during the second write phase may be an inverted version of the control signals during the first write phase. This can utilized to simplify generation of the control signals and can be accomplished owing to the opposite polarity of the particles in combination with the use of the same storage electrode for both write phases.

The storage electrodes may be located on opposite sides of the target area, and in the first write phase, the first type of particles may be moved to or from the first storage electrode; and in the second write phase, the second type of particles may be moved to or from the second storage electrode. Particles being moved to/from the target area from opposite sides means that both types of particles can move an equally short distance during the write phases without the need of e.g. an additional swap phase between the write phases.

The cell may further comprises a gate electrode positioned between one of the storage electrodes and the target area, wherein, in at least one of the write phases, the electrode control signals may be applied so that said gate electrode is set to a potential that retains the particles not being moved to/from the storage electrodes in amount in the target area.

A gate electrode is of particular interest when at least one of the types of particles does not have threshold properties. Note however that a gate electrode can be used also when one or more types of particles have threshold properties. Use of a gate electrode makes the method more versatile.

In the spread phase, the particles in the target area may be distributed and mixed in said target area by switching polarity of a voltage applied between the target area electrodes. The spreading of particles, typically in order to accomplish a uniform and homogenous distribution of the particles over the target area, can be made faster by this type of control. It is here utilized that that the two oppositely charged types of particles are affected in opposite directions by an applied voltage over the target area. For example, when each particle type is mainly at each one of the target area electrodes at the beginning of the spread phase, a polarity switch results in that the particles are driven towards each other and spread over the target area.

The control signals may, during at least a part of at least one of the write phases, be applied in the form of voltage pulses that alternate between a first control signal level and a second control signal level. The alternating pulses allow for better control of the particle movements, which may be explained by a reduction of negative effects caused by electro-hydrodynamic flow. The pulses allow for better control of sub-amounts of the particles, which can be portioned in "packets" to/from the target area, which in turn can be used to e.g. accomplish greyscales or tones of a color.

The first control signal level may be such that allows the particles to move to or from the target area and the second control signal level may be such that prevents the particles to move to or from said target area.

The amount of particles being moved to or from the target area may determined by the duty-cycle and/or the amplitude and/or the frequency and/or of the number of the alternating pulses.

The cell may further comprise an additional type of charged particles, wherein, in the write phase where the first or second type of particles that are moved to and/or from one of the storage electrodes are of the same polarity as the additional type of particles, the electrode control signals may be applied so that also said additional type of particles are moved to and/or from one of the storage electrodes and thereby change in amount in said target area.

The additional type of particles may differ substantially, preferably by a factor of 2 or more, in effective electrophoretic mobility compared to the first or second type of particles having the same polarity as the additional type of particles.

Further, the additional type of particles may differ in threshold properties compared to the first or second type of particles having the same polarity as the additional type of particles.

For example, the first or second type of particle may have no threshold properties when the additional type has, the additionally type may possess no threshold properties while the first or second type do, the additional type's threshold level may differ compared to the first or second type's threshold level etc.

It should be noted that both the first and the second write phase may comprise additional types of particles, i.e. 2 types of particles in each cell and a total of 4 different types of particles in one cell. A single cell can thus be controlled to provide any combination of 4 different particle types in the target area and thus take advantage of combinations of different properties connected with these particle types. For example, if the device is a display device and the particles are pigments of different colors, a single cell may provide any combination of 4 different color components, such as YMCK (actually 3 color components YMC and 1 luminance component K). This may advantageously be combined with cells that are able to also provide different amounts of each particle type in the target area, i.e. cells for which the impact, or influence, of the properties of each particle type can be individually controlled as well. For example, in the pigment particle case, if each color as well can be provided in different tones, or greyscales, the cell can provide a full-color coverage and thus such cells can form or be part of a full-color display. Transport of the particles between the electrodes can take part in one plane and the cell may thus be an in-plane electrophoretic cell.

The transport of the particles between the electrodes may take part in one plane and the cell may thus be an in-plane electrophoretic cell.

A plurality of cells may be arranged as rows and columns in an array, wherein at least one of the electrodes in each cell may be a row electrode which is shared only with other cells arranged in the same row, and at least one of the electrodes in each cell may be a column electrode which is shared only with other cells arranged in the same column, wherein said method may further comprise: selecting the cell to be subjected to the first and second write phases by applying electrode control signals so that the electrode control signals of the row electrode and the column electrode of the cell differ from the electrode control signals being applied to the row and column electrodes of cells that are not to be subjected to the write phases.

In the reset phase and the spread phase all cells in the array may be subjected to the same electrode control signals. Also the control signals during the swap phase can be applied in parallel and be the same for all cells in the array, irrespective if the cells are such that are to be, or have been, written. This makes it possible to execute these phases comparatively fast, at least compared to the write phases when there are cells in all rows that have to be addressed, which typically have to be taken care of in a consecutively, row-by-row manner.

The array may be the form of a passive matrix. Using a passive matrix is attractive from e.g. a cost and manufacturing point of view and the method is compatible with and may advantageously be operated on cells arranged in such matrices.

The device may be an electrophoretic display device, an electrophoretic lens, an electrophoretic dosing device, or a light filtering device. The electrophoretic display device may be in the form of an electronic paper, an electronic signage device, an electronic price tag or an electronic billboard, just to mention some applications.

BRIEF DESCRIPTION OF THE DRAWINGS

Examples of the invention will now be described in detail with reference to the accompanying drawings, in which:

FIG. 1b schematically shows an electrode layout for an electrophoretic cell of the device electrode layout in FIG. 1a.

FIG. 2 is an example for illustrating electrode potentials and charge transfer during different phases in a drive method embodiment.

Figure 1A:
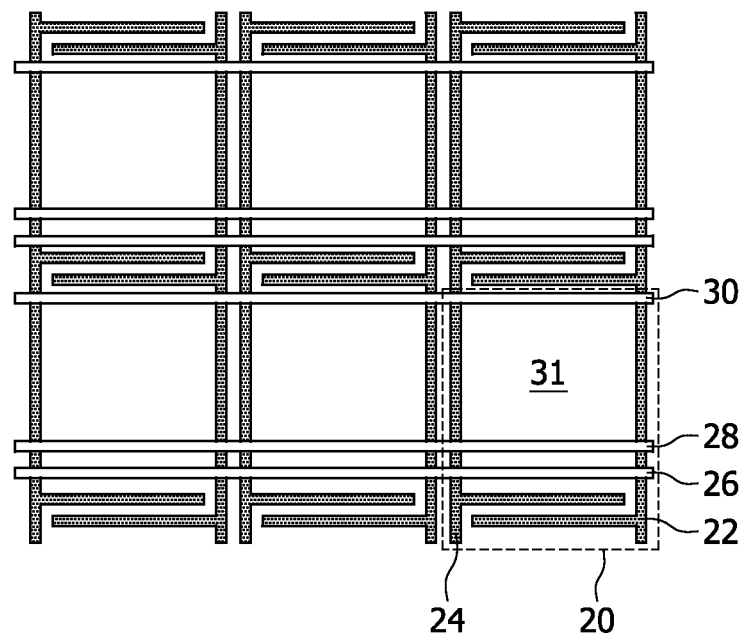
FIG. 1a schematically shows an electrode layout for electrophoretic cells in the form of a passive matrix.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION OF THE EMBODIMENTS

FIG. 1a schematically shows an electrode layout of an electrophoretic device comprising electrophoretic cells. A method according to an embodiment, which will be described in connection with FIG. 2, is operable on the device.

In the following, since a display device will primarily be used as an example, target area and target area electrodes may also, and interchangeably, be referred to as display or viewing area, and display, or viewing electrodes, respectively. Of the same reason, a cell may also, and interchangeably, be referred to as a pixel cell or simply a pixel, and particles may interchangeably be referred to as pigment particles, or simply pigments (referring to a color providing effect of particles in a display device).

Although reference numerals have only been set out for one cell 20 in FIG. 1, it is understood that the shown layout comprises a number of 6 cells 20, arranged in 2 rows and 3 columns. Each cell 20 comprises a suspension of at least two types of particles of opposite charge polarity, a second target area electrode 30, a first target area electrode 28, a gate electrode 26, a first storage electrode 24 and a second storage electrode 22. The electrodes which in FIG. 1a mainly extend vertically have horizontal portions which are parallel to the horizontal electrodes. The cells 20 of FIG. 1a thus comprises only parallel electrode portions.

The first 24 and the second 22 storage electrodes can be equal in area and size, but not necessarily. The second storage electrode can be sized smaller when the second electrode is positioned between the first storage electrode and a pixel wall due to that particles not necessarily need to be positioned on the second storage electrode when the particles by the first storage electrode can be held in position between the first storage electrode and the pixel wall.

Also, the storage electrodes may be different in size when the amount and/or sizes of the particle types differ, for example due to different optical properties of the pigments.

In case of a display device, the particle types are typically pigment particles of different color. The pigment fluid, i.e. the particle suspension, can, although not necessary, contain the same amount of both particle types.

Figure 1B:
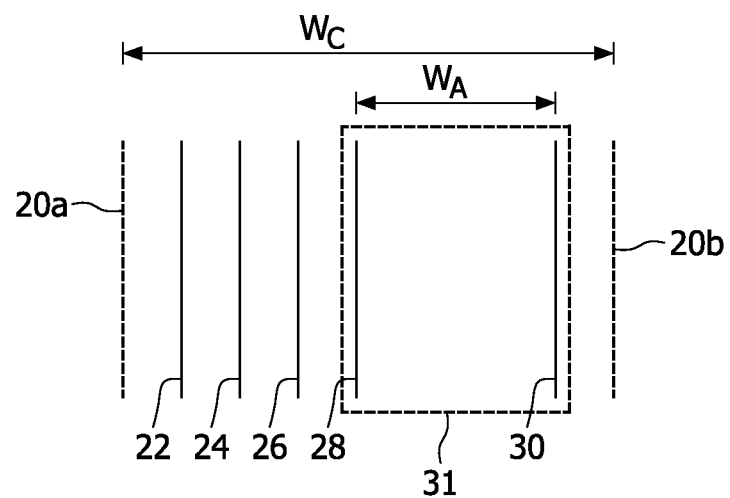

FIG. 1b shows, for purpose of convenient presentation, a main part of a cell 20 where the electrodes are aligned in a parallel fashion between two cell walls 20a, 20b.

The target area electrodes 28, 30 and the space between these constitutes a target area 31. The largest distance between two neighboring electrodes are here between the second target area electrode 30 and the first target area electrode 28. A large target area 31, which allows for a large aperture between the target area electrodes, is desirable in particular when the electrophoretic cells are pixel cells in a display device. The type and amount of pigment particles in the display area determines the optical appearance, such as the color, luminance etc. of the pixel.

Note that what is here referred to as the target area can correspond to a display area in a pixel cell for use in a display application, however, the display area in the meaning of what is actually visible typically refers to only the area in the space between the target area electrodes so as to avoid disturbance by the target area electrodes per se.

The electrodes next to the cell walls 20a, 20b, i.e. here the second target electrode 30 and the second storage electrode 22, may each wholly or partly be part of or integrated in the respective cell wall. One advantageous reason for combining an electrode and a pixel wall is to allow for a larger display area 31.

In an exemplifying implementation of the layout of FIG. 1b, with separate pixel walls and electrodes, an aperture, i.e. the area between the target electrodes, of 200 μm represents about 42% of the total pixel (the ratio WA/WC in FIG. 1b).

In another exemplifying implementation, with the second storage electrode being integrated in the pixel wall, an aperture of 240 µm represents about 50% of the total pixel. The total pixel area is the same for both of the exemplifying implementations.

Figure 1C:
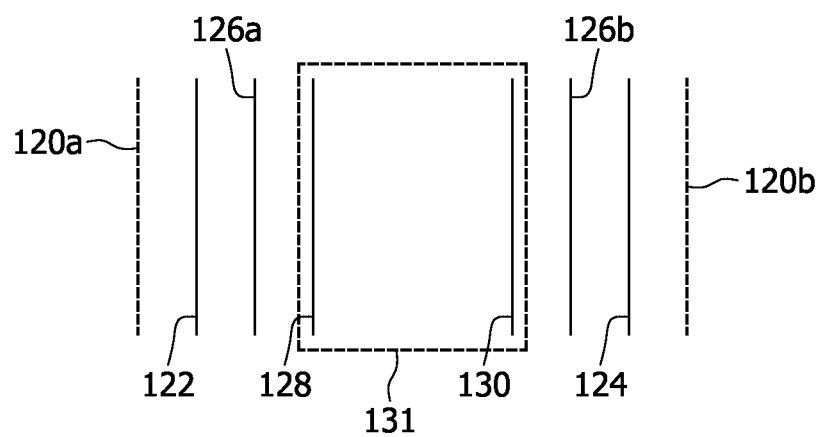
FIG. 1c schematically shows an alternative electrode layout for an electrophoretic cell.

FIG. 1c shows another electrode layout where the electrodes are aligned in a parallel fashion between two cell walls 120a, 120b. Here one storage electrode 122, 124 is positioned on each side of a target area 131 and one gate electrode 126a, 126b separates each storage electrode from the target area.

It may be noted that the electrode layouts from FIGS. 1a-1c, which in the following will be used for reference, are merely given as examples. The person skilled in the art will recognize that the methods to be presented can be operable also on devices having other electrode layouts, such as an electrode layout without gate electrodes when the particles being moved possess threshold properties. Also the shape and size of one or more cells may be different from the examples, and a multitude of difference sized and shaped pixels may be present in the same device.

FIG. 2 is an example for illustrating electrode potentials and charge transfer during different phases of a drive method for an electrophoretic device comprising cells in the form of a passive matrix. In each phase there is shown at least one electrophoretic cell comprising an electrode set corresponding to the electrodes described in connection with FIGS. 1a-1b. Each shown cell in FIG. 2 is for illustrating different positions of two types of oppositely charged particles in the cell. The two types are a first type 32 that is positively charged and a second type 33 that is negatively charged. Exemplary electrode potentials that have resulted in the particle positions are indicated at each electrode in FIG. 2. Note that, for the purpose of the example, the polarities of the voltages between the electrodes, which result from the potentials, are more relevant than the exact potential values. In commercial applications, the potentials are typically some few volts, however, what exact potentials that can, and is desirable, to use have to be determines on a case to case basis and will depend on the application, the type of particles etc.

To the right of a drawn dotted line intersecting in each cell in FIG. 2, is the target area which comprises the target area electrodes 28, 30. To the left of the dotted line is the gate electrode 26, the first storage electrode 24 and the second storage electrode 22.

When there is only one cell shown per phase, i.e. as in the reset phase, this indicates that the electrode potentials and the particle distribution are the same for all cells in the matrix. When there are two cells in a row, the left cell corresponds to a "write" cell, i.e. a cell that during a present addressing cycle has changed its amount of particles in the target area, or a cell that share the storage electrodes with such a cell, i.e. the left cells corresponds to cells having storage electrodes (which may correspond to matrix columns) that have been set to specific potentials (which can be seen as the columns loaded with data) for writing and changing the content of a cell in the matrix. In contrast, the right cells corresponds to "non-write" cells, i.e. cells that share storage electrodes where potentials during the present addressing cycle have been set so that there have been no change of the content, i.e. cells that have retained the amount of particles in the target area. It may be noted that the display electrodes 28, 30 and the second storage electrode 22 in each phase are respectively set to a potential that is the same for all cells, i.e. irrespective of the potentials of the first storage electrode 24 and the gate electrode 26. The display electrodes 28, 30 and the second storage electrode 22 can thus be common electrodes for the array. It may further be noted that the display electrodes even have the same potential in all phases and may thus not even need to change.

For example, the second storage electrode 22 in FIG. 1a may be arranged as one common electrode for the whole display, which e.g. saves costs, and since there is only need for 1 input line (for the first storage electrodes) the risk of a bound failure is smaller when compared to that a situation with a full set of second electrode I/O's.

Figure 3:
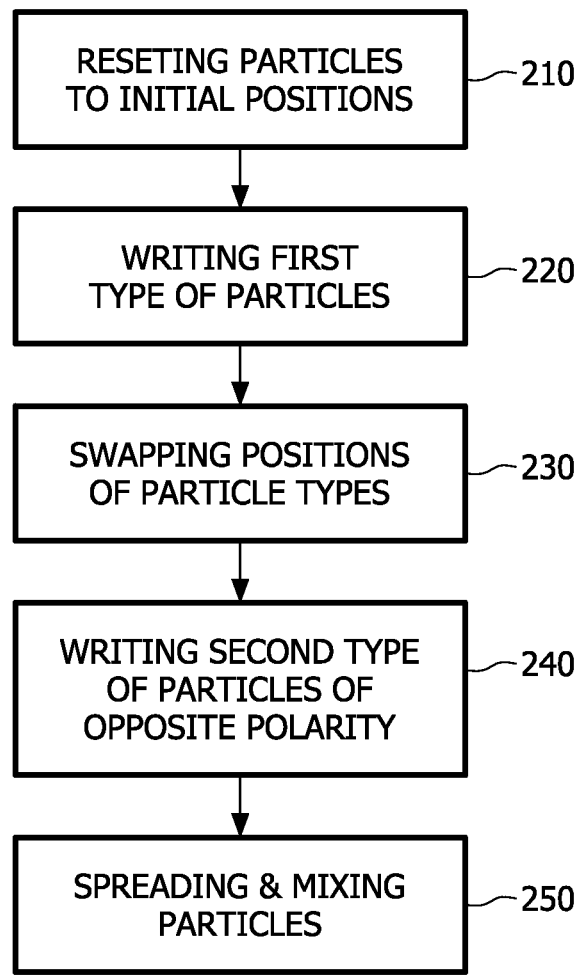
FIG. 3 is a flow chart describing a drive method according to an embodiment.

FIG. 3 is a flow chart which in the following will be used to describe a drive method according to an embodiment. The method will be described with reference to the electrode layouts of FIGS. 1a-1c, the electrophoretic device described in the foregoing, and FIG. 2.

In a first step 210, corresponding to the reset phase of FIG. 2, the particle types 32, 33 are separated and moved to initial positions. Separation of each particle type to initial positions at each of the storage electrodes can be accomplished by first applying the highest electrode potential to the second storage electrode 22, which moves the particle type of negative polarity 33 to this electrode, followed by applying the lowest electrode potential to the first storage electrode 24, which moves the particles of positive polarity 32 to this electrode. Preferably, in a first separating step, a linear potential gradient is used between the outer electrodes. i.e. here the second storage electrode 22 and the second target area electrode 30. Alternatively the intermediate electrodes 24, 26, 28 may be floating or be controlled so that there is a potential gradient that is exponential, asymptotic or logarithmic.

Since before the reset phase, the positions of the particles are unknown or at least different in different cells, the potentials during the reset phase should be set long enough so that virtually all particles get time to move to the respective storage electrode. However, since the reset phase is the same for all cells, the application of the reset phase potentials can be made in parallel to all cells in the matrix, which, in particular for a large matrix, is time saving compared to e.g. "row-by-row" addressing and writing. Another solution for speeding up the reset phase is to use larger potential differences. Particles that potentially have to travel the largest distance, here the negatively charged particles 33 to the second storage electrode 22, preferably are the particles having the largest effective electrophoretic mobility which allow for a faster reset phase. However, the two particle types can also have substantiality the same effective electrophoretic mobility. After the particles 32, 33 have separated and are positioned at determined initial positions at the second storage electrode 22 (+160 V) and the first storage electrode 24 (−100 V) respectively, the gate electrode 26 is set to +160 V to ensure that the particles are held and stay at their initial positions.

Still referring to FIG. 3, after the step 210 follows a step 220, corresponding to the first write phase in FIG. 2, where the positively charged particles 32 in each cell are selected to either remain or change in amount in the target area 31. Cells are selected by lowering the gate electrode 26 voltage to 60 V (select row in FIG. 2). For the selected cells, the positively charged particles are written, i.e. here selected to move to the target area 31, by setting the first storage electrode to +100 V (select row, left column in FIG. 2). Thus, for these cells the voltage between the first storage electrode 24 and the gate electrode 26 is changed and the voltage polarity between these electrodes is reversed. As a result, the first type of particles pass the gate and move to the first target area electrode 28. For the cells that are selected, i.e. share the same gate electrode 26, but where positively charged particles 32 are selected not to move to the target area 31 (select row, right column in FIG. 2), the first target area electrode 28 voltage is not changed and the polarity of the voltage between the first storage electrode 24 and the gate electrode 26 is not changed. As a result the positively charged particles 32 will not pass the gate 26 for these cells.

For cells that are not selected, the gate voltage remains at +160 V (non-select rows in FIG. 2).

For non-selected cells which have a first storage electrode 24 that is shared with selected cells that is being written, the voltage of the first storage electrode is at +100 V (non-select rows, left column in FIG. 2). Hence, when the voltage of the first storage electrode 24 is changed, the polarity of the voltage between the first storage electrode 24 and the gate electrode 26 is not. The gate 26 has a higher potential than both the first target area electrode 28 and the first storage electrode 24 and thus the first type of particles 32 do not pass the gate to the target area 31, or from the target area to the first storage electrode. The latter case is relevant for cells that previously have been written and where the first type of particles 32 already reside in the target area 31.

For non-selected cells which have a first storage electrode 24 that is shared with a selected cell that is not being written (non-select rows, right column in FIG. 2), the voltages are here the same as after the reset phase and the gate 26 thus prevents the first type of particles 32 to move to or from the target area 31.

In FIG. 2 it can further be noted that during the whole first write phase and for all cells, the negatively charged particles 33 are held at their initial position from the reset phase at the second storage electrode 22, which is kept at +160 V. It may be noted that +160 V is the highest potential of all the electrodes, however, more relevant to note is that the potential of the second storage electrode is set so that the first storage electrode, at all values during the first write phase, provides a potential barrier for the negatively charged particles 33 at the second storage electrode 22. Hence, the first storage electrode can during the first write phase be seen as a (locked) gate for the negative polarity type of particles 33 at the second storage electrode 22.

Hence, after all cells having a common gate electrode (rows) have been selected for writing according to the first write phase, the positively charged particles 32 in each cell of the cells are either located on the first storage electrode 24 (non written) or on the first target area electrode 28 (written).

Still referring to FIG. 2, after the step 220 follows a step 230, corresponding to the swap phase in FIG. 2. The particles at the first and second collector electrode are here swapped in position, i.e. the positive polarity particles 32 that for a selected cell have not been written are moved to the second storage electrode 22 to leave room for the negative polarity particles 33 which are moved from the second storage electrode 22 to the first storage electrode 24. It may be noted that this is accomplished by inverting polarity of the voltage between the storage electrodes 22, 24. At the same time the polarity of the gate electrode 26 is inversed and is thus set so that there is accomplished a potential barrier that holds the negative particles 33 in position at the first storage electrode 24. Since the distance between the first and second storage electrodes is relatively small, this change in position happens fairly fast. As previously described also other potentials than those depicted in FIG. 2 may be used in the swap phase, however, the electrode potential should be set so that the positive particles 32 that are in the target area remain there. Further, it may be noted that in the swap phase, the positive polarity particles 32 in the target area 31, will be displaced towards the second target electrode which is at −20 V. This reduces the risk of back flow of the positive polarity particles 32 towards the storage electrodes 22, 24.

Still referring to FIG. 3, after the step 230 follows a step 240, corresponding to the second write phase in FIG. 2. The negatively charged particles at the first storage electrode are here driven using a driving scheme with inverted control signals compared to the ones used during the first write phase. In FIG. 2 it can be seen that the electrode potentials are inverted compared to the first write phase and that the movements and distribution of the negative polarity particles 33 correspond to the movements of the positive polarity particles 32 in the first write phase. It should hence be readily understood that the description and reasoning made above in connection with the first write phase are applicable also to the second write phase.

After the step 240 follows a step 250, corresponding to the spread phase in FIG. 2. At the end of the second write phase, selected amounts of particles are positioned at both or one of the target area electrodes 28, 30, i.e. present in the target area. However, these are not homogenously distributed and mixed. Thus, in the spread phase, the pigments need to travel into opposite directions. To accomplish this, the polarity of the voltage between the target area electrodes is inversed, here by switching potentials between the electrodes. As a result the particles in the target area 31 mix and distribute in the target area (left column in FIG. 2). The polarity of the voltage between the storage electrodes and the polarity of the gate electrode is inversed. This results in that the particles that have not been moved to the target area will be positioned at the same storage electrodes 22, 24 as after the reset phase (right column in FIG. 2). Note that care should be taken in the spread phase with respect to the timing and the order of the polarity inversion of the target electrodes and the gate electrode so as to prevent leakage of particles from the target area back to the storage electrodes.

When a satisfactory distribution and mixing has been achieved, a hold phase (not shown) may follow, where the mixture and distribution is being held. Alternating potentials of low frequency may be used for at least the target area electrodes to accomplish this. The hold phase potentials can be DC, AC, a combination thereof, result from continuous or temporal driving, from no driving, be interrupted at regular or irregular intervals etc.

Since the passive matrix based drive method described above only allow for cells that share a gate electrode to be written in parallel (row-by-row addressing), each write phase typically involve subsequent selection of gate electrodes 26 until cells at all gate electrodes have been selected and written.

When there are N shared gate electrodes (e.g. corresponding to N rows in a passive matrix) there are thus typically a number of N select/write operations. One additional, virtual row may be written to allow for the particles for cells in the Nth row to settle in an equal manner as for the rows previously being addressed.

It should be understood that rows for which no cells need to be written as regards to a certain particle type, can be skipped in the respective write phase.

It should be noted that in the reset phase, the swap phase and the spread phase, the electrode potentials are the same for all cells and thus all cells can be addressed in parallel without the need of e.g. row-by-row addressing, which enable these phases to be performed relatively fast. For example, about 2*N addressing operations have to be performed in the write phases for an array having cells to be written in N rows (one gate electrode for each row of cells), but only 3 addressing operation for the other phases all together. A shortening of the time required to update/write a row of cells by a time ts, may thus lead to a total shortening of 2*N*ts. The difference in speed between the phases, and also improvements, will be most evident in large arrays with many rows of cells to be written, such as typically is the case when writing an image to cells in a display.

In another embodiment, the particles 32, 33 are reset to initial positions in the target area 31. In this case, the phases can be performed in an inversed fashion. This is possible as the two types of particles in the spread phase travel in opposite directions in the target area 31. Thus one type of particles may, by using the gate 26, be selected to move to the first storage electrode 24. In order to remix the remainder of the pigments in the target area 31, the potential between the first and second target area electrode 28, 30 is inversed, which allow the particles at the first storage electrode 24 to simultaneously be moved towards the second storage electrode 22, and the other type of particles to be moved via the gate 26 to the first storage electrode 24. If the previously described method updates a display device from a "light" state (no particles in the target area, this "inverse" method updates it from a "dark state" (all particles in the target area).

In yet another embodiment, the method is operated on a electrode layout corresponding to FIG. 1c. Here the first and second write phase can be executed simultaneously. Positively charged particles may e.g. be moved from the first storage electrode 122 to the first target area electrode 128 via the gate electrode 126a, while at the same time negatively charged particles are moved from the first storage electrode 124 to the second target area electrode 130 via the gate electrode 126b.

It should be understood that this is possible owing to the two target area electrodes and the particle types of opposite polarity. Also in this embodiment there is a reset phase so that the particles initially are at determined positions in each cell. No swap phase is however needed since the storage electrodes do no need to store different types of particles. The spread phase can be the same as previously described.

In yet another embodiment the particle types possess threshold properties. It should be recognized that in this case the gate electrodes can be omitted and the threshold levels of the particles can replace the "threshold" function of the gate electrode, i.e. the potential barrier provided by the gate electrode to prevent passage of particles to or from the target area as described in the foregoing.

Instead of moving all particles to/from the target area, the method may involve moving sub-amounts, e.g. in order to accomplish "greyscales" or tones of a color in a display device. For example, for 4 (=2 bit) tones of a color, the write phase for one type of particles (such as the positively charged ones) may be split into two write periods, one with ⅔ of the transit time and the other with ⅓. The duration of each write period is thus set shorter than the time required to move all of the particles (the total period). This means that also fractions of particles, roughly corresponding to the fractions of the total period, can be selected to be transferred from the first storage electrode to the first target area electrode. In one example, during the first write phase period, the pixels that will have 66% and 100% absorption are written to the target area, whilst during the second write period the pixels with 33% and 100% are written. Note that the same pixel can be written a second time since the particles that already have been written to the first target area electrode 26 during the first write phase period are not disturbed by the second write phase period.

It should be noted that it is not required that all particles move to or from the target area for a cell to be written and that thus different ways of producing greyscales by writing sub-amount of particles to the target area can be accomplished. Greyscale writing can be executed within one or both of the write phases.

One particularly advantageous method for writing greyscales involves modulating electrode potentials for selected cells that are to be written by alternating potentials between a "write"-potential level and a "non-write" potential. This method will now be described in some detail with some reference to and in relation to the method that was described in the foregoing.

Rather than in a write phase applying a stationary potential to the first storage electrode 26 for a selected cell to be written, the first storage electrode potential is modulated by repeatedly switching the potential between a "write" and a "non-write potential. For example, in the first write phase of FIG. 2, where a first storage electrode "write" potential is +100 V and a non-write potential is −100 V, the selected, left column cell would be switched between e.g. +100 V and −100 V. The modulation hence manifests as a train of N pulses during the write phase.

Figure 4:
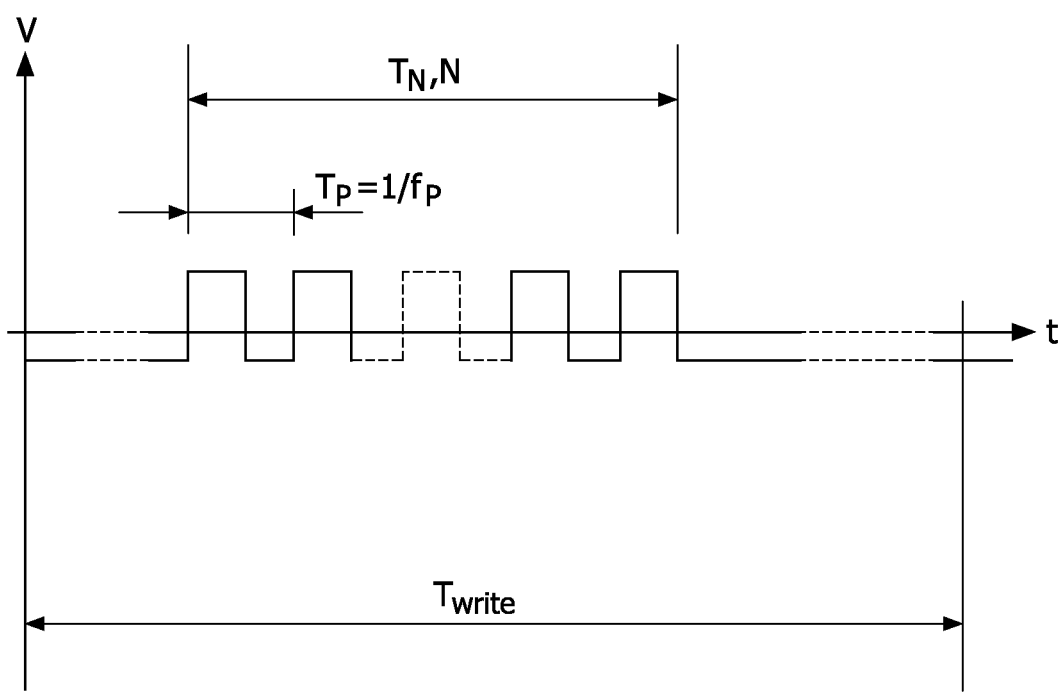
FIG. 4 is a schematic example of a modulated electrode potential.

FIG. 4 is a schematic example of such a modulated electrode potential. A pulse n of the number of totally N pulses of amplitude A has a period TP. The N pulses has a duration TN, and the duration of the write phase is Twrite. By varying the duty-cycle, i.e. the fraction of TP that corresponds to a "write" potential, i.e. a potential that allow transfer of particles to/from the target area, the amount of particles being transferred to (or from) the target area can be controlled. The pulses may be tuned so that a duty-cycle of 50% results in that no particles pass the gate. Deviations from a 50% duty cycle then results in a net change of the amount of particles in the target area.

Other parameters of the pulse train that can be varied in order to control the amount of particles to be moved to (or from) the target area, e.g. the amplitude of the pulses, the duration of the pulses (TPn), the pulse train duration (TN) and the pulse train duration (TN)fraction of the duration of the write phase (Twrite).

A control word of 8 bits may e.g. determine how many of 256 sub-amounts of particles that are to be moved to (or from) the target area. The maximum control word value 0 may e.g. result in a 100% duty cycle and that all particles move to the target area and the minimum control value of 255 may result in that no particles are moved to the target area. It can be noted that in the case of square wave shaped pulses, a 100% duty cycle corresponds to a stationary (write) potential.

It should be appreciated that this "modulated potential" way of accomplishing sub-amounts of particles in the target area (greyscales) can be performed within a single write phase without the need of writing sub-amounts (grey-levels) in subsequent phases.

In one embodiment, two types of particles are written in each write phase and there are thus two additional types of particles in each cell, one of each polarity. These types of particles differ in effective electrophoretic mobility of about a factor 2 or more compared to the other particle having the same polarity. This embodiment will now be described in some detail with reference to the previously described drive method and the method for writing greyscales based on modulated potentials.

Figure 5A:
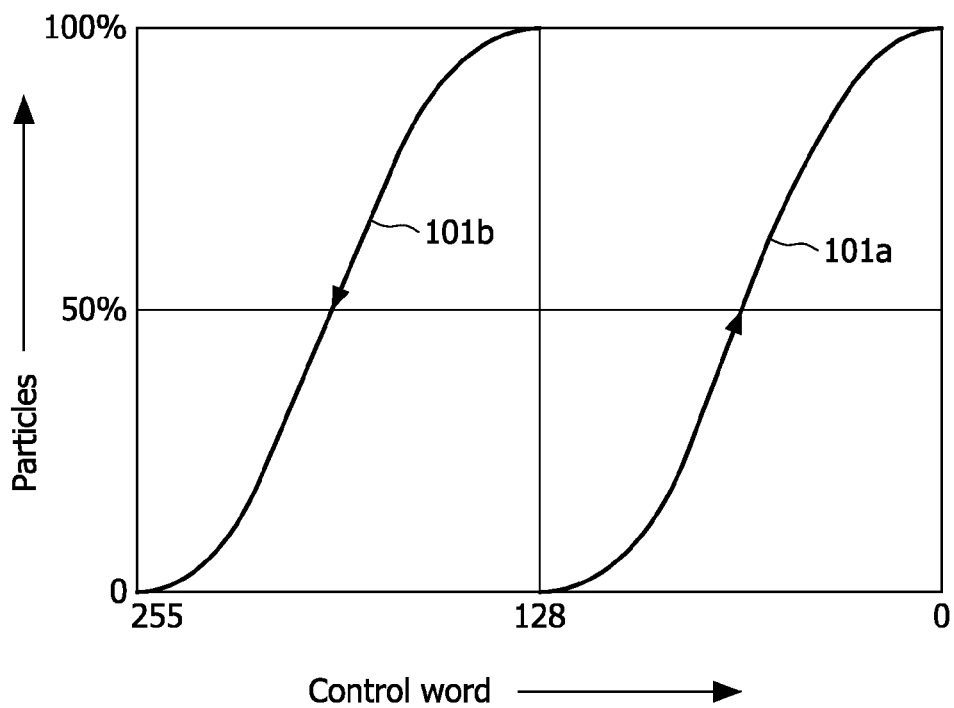
FIG. 5a schematically shows changes in amount of one type of particles at different control words corresponding to different levels of modulation of an electrode potential.

FIG. 5a depicts sub-amounts of the total amount of particles that can be moved to the target area by the greyscale writing in a write phase for a single type of particles, such as for one type of positively charged particles. The sub-amounts may e.g. correspond to luminance values provided in a pixel cell of a display. For a modulation of the first storage electrode potential which corresponds to a control word value above 128 (8 bits word), the particles do not pass the gate 26 into the target area 31, but for values below 128, more and more particles are moved to the target area 31, as is illustrated by a line 101a in FIG. 5a. A control word of 128 may thus correspond to a duty-cycle of 50%, a control word of 0 to a 100% duty cycle and a control word of 255 to a 0% duty cycle. The control word values between 255 and 0 thus corresponds to duty cycles between 0 and 100%. When particles are positioned in the target area, duty cycles below 50% results in that particles are moved from the target area. Hence, when the duty cycle is varied between 0 and 100%, which is equivalent to varying the control word between 255 and 0, the result is curves 101a and 101b, which form a hysteresis type of curve.

Figure 5B:
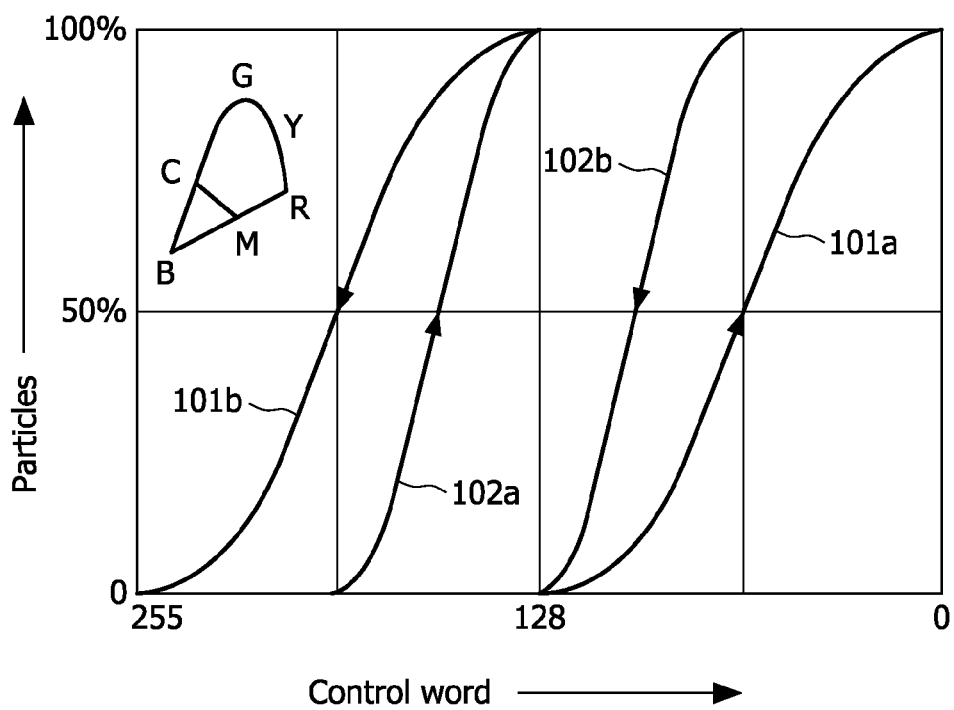
FIG. 5b shows the curve of FIG. 5a and a corresponding curve for another particle type having a different electrophoretic mobility.

FIG. 5b shows the curves 101a-b from FIG. 5a, but now also corresponding curves 102a-b are drawn for the additional particle type of the same polarity but that have about twice the effective electrophoretic mobility. The additional type of particles will thus move faster to the target area. In fact, for a factor two difference in effective mobility, the particles of the additional type move to the target area already at a control word value of 192, and the full amount of the particles of the additional type have been written at a control word value of 128. Thus, just before the point (control word value 128) at which the first type of particle is able and starts to cross the gate to the target area, the whole of the particles of the additional type is already in the target area. When the additional type of particles are moved from the target area, the result is curve 102b.

The two, substantially non-overlapping "hysteresis" curves 101a-b and 102a-b of FIG. 5b means that, in a single write phase, two types of particles of the same sign can be controlled and moved to/from the target area.

It should be recognized that similar non-overlapping "hystersis" curves can also be achieved when the particle types e.g. differ in threshold instead of, or in combination with, a difference in effective electrophoretic mobility.

Note that the additional particle type may need to first be fully written to the target area before the excess amount is recollected towards the first storage electrode. This may for example be the case when only the first type of particles should be in the target area.

When the different particle types represent different colors, such as cyan and magenta, different combination of these colors can be accomplished.

It will be understood that by employing the same principle also in the second write phase, a total of four different particle types can be written to/from the target area in various amounts of each type.

This can for example be utilized to control 3 differently colored pigments (YMC) to achieve different combinations of these colors. A fourth black pigment can be controlled to set any luminance level corresponding to no, or a full amount of, black particles in the target area. When there are black particles in the target area, the reflective properties of a white reflector in the target area may determine the upper luminance level.

It should be understood that the principle can be extended so that also three types of different particles of the same sign can be addressed individually in a write phase. For example, there can be one type of particles that do not have threshold properties, two types of particles having a threshold differing by substantially a factor of two. Substantially non-overlapping hysteresis curves cab be formed also in that case. Thus a total of six different particle types can be written to/from the target area in various amount of each type. This can for example be utilized to control 6 differently colored pigments (Y1Y2M1M2C or RGBYMC) to achieve photo-quality electronic paper.

Further, the method has been described for passive matrix addressing, however, as the person skilled in the art will recognize, the underlying principles are also applicable for active matrices. It may also be recognized that other particles systems for reaching a full-color display can be utilized, for example RGB, use of scattering particles and a black background etc. Moreover, examples have been made with reference to electrode structures in one plane. Although it may be especially advantageous to operate the method on such structures, it will be recognized that the method may also be operated on electrode structures where the electrodes are in different planes and/or at different carriers. For example, the gate electrode may be elevated in order to also, or in addition, obstruct particle displacement mechanically rather than by electric gating (a partial pixel wall is thus present).

While the invention has been illustrated and described in detail in the drawings and foregoing description, such illustration and description are to be considered illustrative or exemplary and not restrictive; the inventions is not limited to the disclosed embodiments. Variations to the disclosed embodiments can be understood and effected by those skilled in the art in practicing the claimed invention, from a study of the drawings, the disclosure, and the appended claims. In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A drive method for an electrophoretic cell (20), said cell comprising:
   a first storage electrode (24),
   a second storage electrode (22),
   a first target area electrode (28),
   a second target area electrode (30),
   a first type of particles (32) and
   a second type of particles (33),
   said second type of particles being of opposite charge polarity to the first type of particles, said first and second target area electrodes (28, 30) and an area extending between said first and second target area electrodes (28, 30) representing a viewable target area (31), each of said first and second storage electrodes (22, 24) being located outside said target area (31) said first storage area, said second storage electrode (22) and said target area being positioned on a same side of a same supporting surface, wherein said first storage electrode and said second storage electrode laterally adjacent to each other on a first side of said first storage area and said first storage area and said target laterally adjacent to each other on said same side of said same supporting surface on a second side of said first storage electrode, said method comprising:
   in a reset phase (110), applying electrode control signals so that said first and second type of particles are reset to determined reset positions on corresponding first storage electrode and second storage electrode, respectively, in said cell;

in a first write phase (120), applying electrode control signals so that the first type of particles (32) are moved to change an amount of the first type of particles in said target area (31) and a current amount of the second type of particles is retained in the target area, wherein said movement comprises one of:

moving to and moving from one of the first storage electrode and the second storage electrode;

in a second write phase (140), applying electrode control signals so that the second type of particles (33) are moved to change an amount of said second type of particles in said target area (31) and an amount of the first type of particles is retained in the target area, wherein said movement comprises one of:

moving to and moving from one of the first storage electrode and the second storage electrode; and in a spread phase (150), applying electrode control signals so that the first and second type of particles (32, 33) which are positioned in said target area (31), distribute and mix in said target area.

2. The drive method as claimed in claim 1, further comprising:

in the first write phase (120), the first type of particles (32) are moved to and/or from the first storage electrode (24);

in a swap phase (130), between the write phases, applying electrode control signals so that any particles (32) of the first type at the first storage electrode (24) will swap to the second storage electrode (22); and in the second write phase (140), the second type of particles (33) are moved to and/or from said first storage electrode (24).

3. The drive method as claimed in claim 2, wherein the control signals during the second write phase (140) are an inverted version of the control signals during the first write phase (120).

4. The drive method as claimed in claim 1, wherein:

in the first write phase (120), the first type of particles (32) are moved to or from the first storage electrode (124); and in the second write phase (140), the second type of particles (33) are moved to or from the second storage (122) electrode.

5. The drive method as claimed in claim 1, wherein the cell further comprises:

a gate electrode positioned between one of the storage electrodes and the target area, wherein, in at least one of the write phases, the electrode control signals are applied so that said gate electrode is set to a potential that retains the particles not being moved to/from the storage electrodes.

6. The drive method as claimed in claim 1, wherein in the spread phase, the particles in the target area are distributed and mixed in said target area by switching polarity of a voltage applied between the target area electrodes.

7. The drive method as claimed in claim 1, wherein the control signals, during a part of at least one of the write phases, are applied in the form of voltage pulses that alternate between a first control signal level and a second control signal level.

8. The drive method as claimed in claim 7, wherein the first control signal level allows the particles to move to or from the target area (31) and the second control signal level prevents the particles to move to or from said target area.

9. The drive method as claimed in claim 7, wherein the amount of particles being moved to or from the target area is determined by at least one of: a duty-cycle, an amplitude, a frequency (fp) and a number (N) of the voltage pulses alternating between the first control signal level and the second control signal level.

10. The drive method as claimed in claim 1, wherein the cell further comprises:

an additional type of charged particles, wherein, in the write phase where the first or second type of particles that are moved to and/or from one of the storage electrodes are of the same polarity as the additional type of particles, the electrode control signals are being applied so that also said additional type of particles are moved to and/or from one of the storage electrodes and thereby change in amount in said target area.

11. The drive method as claimed in claim 10, wherein the additional type of particles differ by a factor of at least 2, in effective electrophoretic mobility compared to the first or second type of particles having the same polarity as the additional type of particles.

12. The drive method as claimed in claim 10, wherein the additional type of particles differ in threshold properties compared to the first or second type of particles having the same polarity as the additional type of particles.

13. The drive method as claimed in claim 1, wherein transport of the particles between the electrodes takes place in one plane and the cell thus is an in-plane electrophoretic cell.

14. The drive method as claimed in claim 1, wherein a plurality of cells are arranged as rows and columns in an array, wherein at least one of the electrodes in each cell is a row electrode which is shared only with other cells arranged in the same row, and at least one of the electrodes in each cell is a column electrode which is shared only with other cells arranged in the same column, said method further comprising selecting the cell to be subjected to the first and second write phases by applying electrode control signals so that the electrode control signals of the row electrode and the column electrode of the cell differ from the electrode control signals being applied to the row and column electrodes of cells that are not to be subjected to the write phases.

15. The drive method as claimed in claim 14, wherein in the reset phase and the spread phase all cells in the array are subjected to the same electrode control signals.

16. An electrophoretic device comprising:

at least one electrophoretic cell (20), said cell comprising:

a first storage electrode (24), a second storage electrode (22), a first target area electrode (28), a second target area electrode (30), a first type of particles (32); and a second type of particles (33), said second type of particles being of opposite charge polarity to the first type of particles, said first and said second target area electrodes (28, 30) and an area extending between said first and said second target area electrodes (28, 30) representing a viewable target area (31), each of said first and said second storage electrodes (22, 24) being located outside said target area (31)

said first storage electrode, said second storage electrode (22) and said target area being positioned on a same side of a supporting surface, wherein said first storage electrode and said second storage electrode laterally adjacent, to each other on a first side of said first storage area and said first storage electrode and said target area laterally adjacent to each other on said same side of said supporting surface on a second side of said first storage electrode, said device further comprising:

a controller for controlling electrode potentials of said at least one electrophoretic cell (20), said controller being adapted to:

in a reset phase (110), applying electrode control signals so that said first and second type of particles are reset to determined reset positions on corresponding first storage electrode and second storage electrode, respectively, in said cell;

in a first write phase (120), applying electrode control signals so that the first type of particles (32) are moved to change an amount of the first type of particles in said target area (31) and a current amount of the second type of particles is retained in the target area, wherein said movement comprises one of:

moving to and moving from one of the first storage electrode and the second storage electrode;

in a second write phase (140), applying electrode control signals so that the second type of particles (33) are moved to change an amount in said target area (31) and an amount of the first type of particles is retained in the target area, wherein said movement comprises one of:

moving to and moving from one of the first storage electrode and the second storage electrode; and in a spread phase (150), applying electrode control signals so that the first and second type of particles (32, 33) which are positioned in said target area (31), distribute and mix in said target area.

17. The electrophoretic device as claimed in claim 16, wherein the device is at least one of: an electrophoretic display device, an electrophoretic lens, an electrophoretic dosing device, and a light filtering device.

18. The electrophoretic display device as claimed in claim 17, wherein the electrophoretic display device is in the form of at least one of: an electronic paper, an electronic signage device, an electronic price tag or an electronic billboard.

19. A drive method for an electrophoretic cell (20), said cell comprising:

a first storage electrode (24),
a second storage electrode (22),
a first target area electrode (28),
a second target area electrode (30),
a first type of particles (32) and
a second type of particles (33), said second type of particles being of opposite charge polarity to the first type of particles, said first and second target area electrodes (28, 30) and an area extending between said first and second target area electrodes (28, 30) representing a target area (31), said first storage electrode, said second storage electrode and said target area being positioned on a same side of a supporting surface, wherein said first storage electrode and said second storage electrode laterally adjacent to each other on a first side of said first storage area and said first storage electrode and said target are laterally adjacent to each other on said same side of said supporting surface on a second side of said first storage electrode, said method comprising:

in a reset phase (110), applying electrode control signals so that said first and second type of particles are reset to determined reset positions on corresponding first storage electrode and second storage electrode, respectively, in said cell;

in a first write phase (120), applying electrode control signals so that the first type of particles (32) are moved to change an amount in said target area (31) and a current amount of the second type of particles is retained in the target area, wherein said movement comprises one of:

moving to and moving from one of the first storage electrode and the second storage electrode;

in a second write phase (140), applying electrode control signals so that the second type of particles (33) are moved to change an amount of said second type of particles in said target area (31) and an amount of the first type of particles is retained in the target area, wherein said movement comprises one of:

moving to and moving from one of the first storage electrode and the second storage electrode; and in a spread phase (150), applying electrode control signals so that the first and second type of particles (32, 33) which are positioned in said target area (31), distribute and mix in said target area.

* * * * *